United States Patent [19]
Nelson et al.

[11] Patent Number: 6,061,358
[45] Date of Patent: May 9, 2000

[54] DATA COMMUNICATION SYSTEM UTILIZING A SCALABLE, NON-BLOCKING, HIGH BANDWIDTH CENTRAL MEMORY CONTROLLER AND METHOD

[75] Inventors: Jeffrey J. Nelson, Louisville; James P. Fugere, Boulder, both of Colo.

[73] Assignee: McData Corporation, Broomfield, Colo.

[21] Appl. No.: 08/800,252

[22] Filed: Feb. 13, 1997

[51] Int. Cl.⁷ ................................................... H04L 12/56
[52] U.S. Cl. ........................................... 370/412; 370/429
[58] Field of Search .................................. 370/412, 413, 370/414, 415, 416, 417, 418, 419, 420, 423, 429; 711/100, 147, 149, 153

[56] References Cited

U.S. PATENT DOCUMENTS

| | | | |
|---|---|---|---|
| 5,233,606 | 8/1993 | Pashan et al. | 370/418 |
| 5,404,504 | 4/1995 | Byers et al. | 714/47 |
| 5,412,653 | 5/1995 | Hoppe et al. | 370/360 |
| 5,517,519 | 5/1996 | Carbone, Jr. et al. | 375/211 |
| 5,521,916 | 5/1996 | Choudhury et al. | 370/414 |
| 5,524,218 | 6/1996 | Byers et al. | 710/129 |
| 5,526,484 | 6/1996 | Casper et al. | 709/237 |
| 5,535,197 | 7/1996 | Cotton | 370/414 |
| 5,544,347 | 8/1996 | Yanai et al. | 711/162 |
| 5,553,302 | 9/1996 | Morrissey et al. | 710/5 |
| 5,584,041 | 12/1996 | Odawara et al. | 710/14 |
| 5,687,316 | 11/1997 | Graziano et al. | 395/200.8 |
| 5,721,833 | 2/1998 | Cooperman et al. | 395/250 |
| 5,724,358 | 3/1998 | Headrick | 370/418 |
| 5,757,771 | 5/1998 | Li et al. | 370/235 |
| 5,787,086 | 7/1998 | McClure et al. | 370/413 |

OTHER PUBLICATIONS

Dedek, Jan, et al., "What is Fibre Channel?", 2ⁿᵈ Edition, ©1994, 1995 ANCOT Corporation, 115 Constitution Drive, Menlo Park, California 94025.

*Primary Examiner*—Chau Nguyen
*Assistant Examiner*—Soon-Dong Hyun
*Attorney, Agent, or Firm*—William J. Kubida; Hogan & Hartson LLP

[57] ABSTRACT

A high bandwidth central memory controller utilizing a pipelined TDM bus such that each serial interface can sustain a bandwidth of up to 100 MByte/second for both the transmission and reception of variable length frames. Each port is assigned a fixed number of queues, a TDM slot number and the address routing for all other queues associated with the remaining ports at initialization, such that when a frame is received, the appropriate queue is determined from the addressing in the frame header and the initialized route tables. When the port's TDM slot for a memory request is active, a request for the output queue is made to the central memory controller if an "output queue available" indication is returned and the frame data is placed on the bus during the input port's data TDM slot. If the output queue is not available, the input port may either discard the received data frame or generate a busy/reject frame to be placed on one of its own output queues during its TDM data slot.

34 Claims, 14 Drawing Sheets

A. OUTPUT PORT REGISTERS

1. OUTPUT QUEUES

| Q_WR | WRITE POINTER |
| Q_RD | READ POINTER |
| Q_COE | COUNT OF ENTRIES |
| Q_MAX_COE | MAXIMUM COUNT OF ENTRIES |
| Q_TIMER | QUEUE TIMER |

5 REGISTERS PER QUEUE, 4 QUEUES PER PORT:
1. CLASS F (IEL'S)
2. CLASS 2,3 LINK CONTROL
3. CLASS 2 DATA
4. CLASS 3 DATA

2. OUTPUT PORT CONTROL

| STATE | OUTPUT PORT STATE:<br>-READY FOR OUTPUT.....<br>-LONG FRAME IN PROG. |
| HLNK_RDPTR | "LONG FRAME" HORIZONTAL LINK READ POINTER |

B. INPUT PORT REGISTERS

| STATE | INPUT PORT STATE:<br>-LONG FRAME IN PROG. |
| HLINK_WRPTR | "LONG FRAME" HORIZONTAL LINK WRITE POINTER. |

C. FREE MEMORY REGISTERS

| FREEQ_RDPTR | READ POINTER |
| FREEQ_WRPTR | WRITE POINTER |
| FREEQ_COE | COUNT OF ENTRIES |

3 REGISTERS PER BUFFER TYPE PER PARTITION

*Fig. 4*

DATA COMMUNICATION SYSTEM UTILIZING A SCALABLE, NON-BLOCKING, HIGH BANDWIDTH CENTRAL MEMORY CONTROLLER AND METHOD

BACKGROUND OF THE INVENTION

The present invention relates, in general, to the field of computer data switching systems. More particularly, the present invention relates to a data communication system utilizing a scalable, non-blocking, high bandwidth central memory controller and method employing a pipelined, time division multiplexed ("TDM") bus in combination with high speed dual-ported memory buffers and link list technology.

"Fibre Channel" is the name given to a set of standards developed by the American National Standards Institute ("ANSI") which defines certain protocols for information transfer. Fiber Channel devices are individually known as "nodes", each of which has at least one "port" to provide access thereto. The components that then connect two or more ports are denominated as a "topology". Each port uses a pair of "fibres" (electrical wires or optical strands), one to carry information into the port and another to carry it out of the port. The fibre pair is known as a "link". The information transmitted over a link is transferred in indivisible units called "frames". The Fibre Channel standard permits dynamic interconnections between nodes through ports connected by means of a "switch" or "router" (also sometimes referred to as a "fabric") and it is possible, therefore, for any node to communicate with any other node through the "switch" or "router".

Among the techniques which have heretofore been utilized to provide switching capabilities for high speed ports are cross point switching, input queuing and output queuing. A fundamental disadvantage of cross point (or "switched topology") switching is that only one connection at a time can exist to any particular output. Thus, for example, if ports 1 and 2 are in connection and port 3 receives a frame for port 1, port 3 must wait until port 1 becomes available before it can transmit the frame. If, as in this instance, a frame is "waited" and a subsequent frame destined for port 4 is received, even though port 4 may be available, the frame is "blocked" at port 3 until the frame for port 1 is ultimately delivered.

Input queuing is similar in some respects to cross point switching in that it exhibits similar blocking characteristics. In this regard, frames for output ports are buffered at the input and are only delivered when the desired output becomes available. As a consequence, any subsequent frames have the potential to be blocked by the previous frame. On the other hand, output queuing overcomes the blocking problems associated with the cross point switching and input queuing techniques. However, the bandwidth required for the cutput buffer must equal the sum of all possible inputs. For example, a switching system with sixty four 100 MByte/second ports must ensure that each output port is able to sustain 6.3 GByte/second of bandwidth to provide for a non-blocking architecture.

In an attempt to alleviate certain of the problems inherent in the preceding switching architectures, at least one asynchronous transfer mode ("ATM") approach has utilized a TDM bus with wide central memory. However, the architecture proposed also exhibits several critical limitations in that ATM, through the use of fixed cell length, does not have to address the issue of variable length frames and, since the memory width equals the cell length, no horizontal linking of buffers is required. Also, the number of TDM slots is equal to two times the number of ports and each port is allocated an input and an output slot and does not perform input and output during the same TDM slot because the memory is not dual ported. Thus, either the memory word must be twice as wide or the TDM cycle must be half the time to sustain the same total bandwidth.

SUMMARY OF THE INVENTION

Disclosed herein is a scalable, non-blocking, high bandwidth central memory controller and method which overcomes the disadvantages of previous switching architectures. In a particular embodiment disclosed herein, the high bandwidth central memory controller of the present invention can be utilized with up to sixty four (or sixty five) 100 MByte/second full duplex serial interfaces (e.g. Fibre Channel) and a total of up to 12.8 GByte/second of memory bandwidth can be achieved. The system and method of the present invention may also be scaled back to thirty two (or thirty three) ports and a memory bandwidth of 6.4 GByte/second in other applications.

The high bandwidth central memory controller of the present invention utilizes a pipelined TDM bus such that each serial interface can sustain the full bandwidth of 100 MByte/second for both the transmission and reception of variable length frames. Each port is assigned a fixed number of queues, a TDM slot number and the address look-up tables to the other queues associated with the remaining ports at initialization. When a frame is received, the appropriate queue is determined via look-up tables from the addressing in the frame header and the initialized route tables. When the port's TDM slot for a memory request is active, a request for the output queue is made to the central memory controller. If the "output queue available" indication is returned, the frame data is placed on the bus during the input port's data TDM slot. On the other hand, if the output queue is not available, the input port may either discard the received data frame or generate a busy/reject frame to be placed on one of its own output queues during its TDM data slot.

The central memory controller is responsible for linking the frame onto the output queue. If the frame fits within the word width of the memory, or it is the first request for a new frame, the "count of entries" is incremented and then the queue link pointers for the output queue are updated if the count of entries is greater than one. If the frame is larger than the word width of the memory, each subsequent TDM data cycle for the input port will output the next sequential data from the frame until the entire frame has been written to memory. Each of these data cycles links the current data word to the previous word through the use of horizontal link pointers. Each buffer written into memory has context information stored with it to indicate whether the buffer was an "only", "first", "middle" or "last" buffer for that entry.

If an output queue contains entries and the associated output port is available during that port's TDM data cycle, a queue entry and context are read from the memory and moved to the output port. If the queue entry contains a single frame within the memory word width, the pointer to the next queue entry (if any) is saved for the next TDM cycle and the "count of entries" is modified. If the entry contains a frame that is larger than a single memory word, the horizontal pointer to the next buffer is saved until the last buffer for that frame is read from memory.

Through the utilization of a pipelined TDM bus, in combination with high speed dual ported memory devices and link list technology, the present invention provides a scalable, non-blocking, full duplex, memory queue architecture for variable length frames that can sustain an extremely high bandwidth.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein:

FIG. 4 is an illustration of the various registers of the central memory switch of the embodiment of the present invention illustrated in the preceding figures inclusive of the output port registers with their output queues and output port control as well as the input port registers and free memory registers;

DESCRIPTION OF A PREFERRED EMBODIMENT

Figure 1:
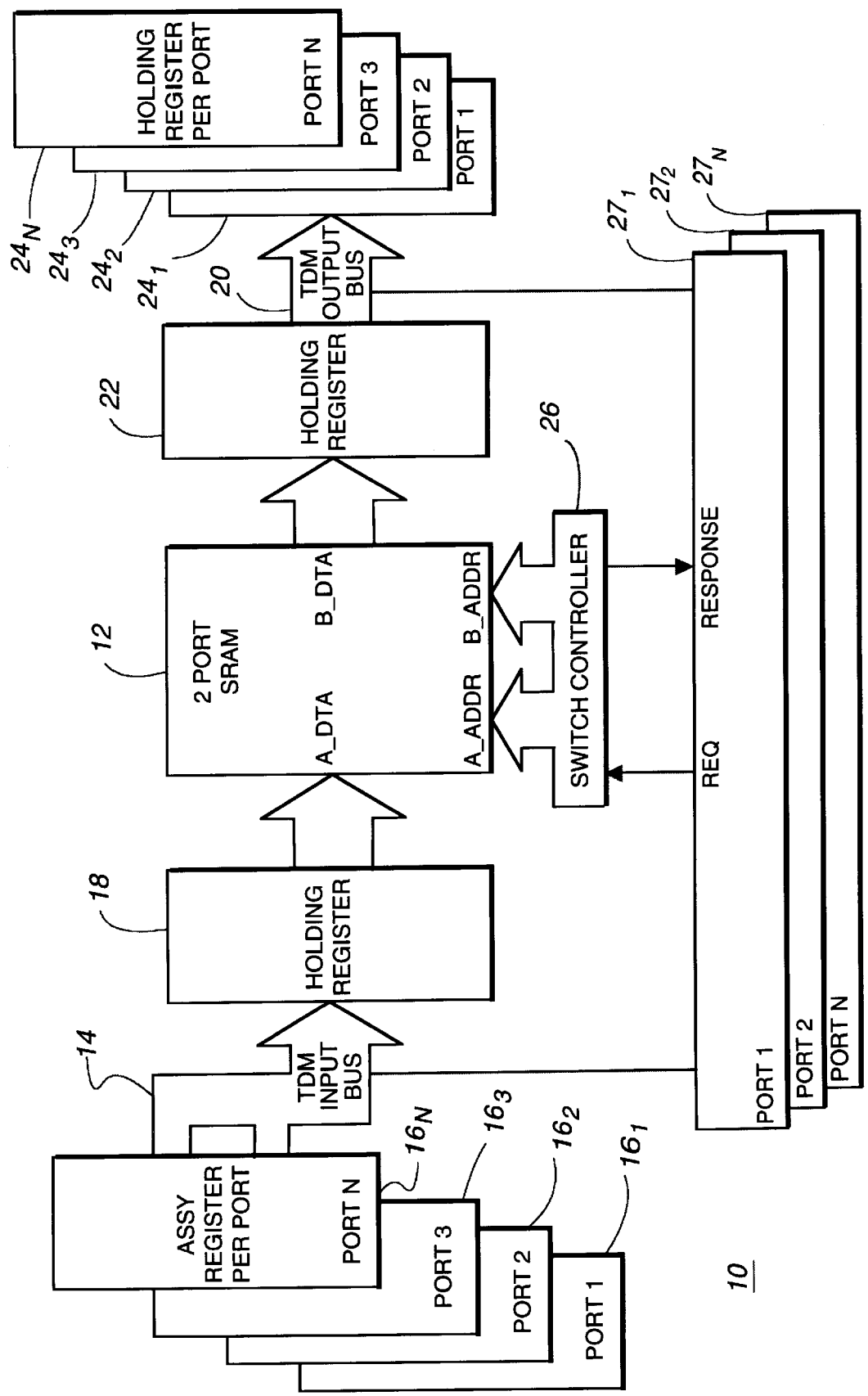
FIG. 1 is a functional block diagram of a central memory switch architecture in accordance with a particular embodiment of the present invention.

With reference now to FIG. 1, a central memory switch 10 in accordance with a specific embodiment of the present invention is shown. The memory switch 10 comprises, in pertinent part, a dual port memory 12 which may comprise a plurality of two-port static random access memory ("SRAM") integrated circuits ("ICs") such as the IDT7014S series available from Integrated Device Technology (IDT), Santa Clara, Calif.

The dual port memory 12 has an A_DTA input port thereof coupled to a TDM input bus 14 for coupling a plurality of assembly registers $16_1$ through $16_N$ corresponding to ports 1 through N respectively by means of an input holding register 18. The dual port memory 12 also has a B_DTA output coupled to a TDM output bus 20 through an output holding register 22 to provide output to a plurality of holding registers $24_1$ through $24_N$ corresponding to ports 1 through N respectively. A switch controller 26 operatively controls the functionality of the dual port memory 12 by signals placed on the A_ADDR and B_ADDR address inputs thereto.

The centralized queuing structure of the central memory switch 10 accommodates all of the queue management functions for all of the input and output ports 1 through N. In operation, the specific embodiment of the present invention illustrated stores 128 bytes of data at a time which are received a byte at time from the memory switch 10 links. The data is concatenated until a complete frame is received or a 128 bytes have been received. Upon receipt of 128 bytes of data, a request is raised to the switch controller 26 at the appropriate TDM cycle identifying that the data is available as well as its intended destination queue. The switch controller 26 manipulates and manages a count of entries and supplies the appropriate address to the dual port memory 12 as will be more fully described hereinafter. The switch controller 26 is operative in conjunction with a plurality of ports $27_1$ through $27_N$ (corresponding to Ports 1 through N) to receive request ("REQ") signals therefrom and provide responses thereto. The ports $27_1$ through $27_N$ are coupled to the TDM input bus 14 and the TDM output bus 20 as shown.

Figure 2:
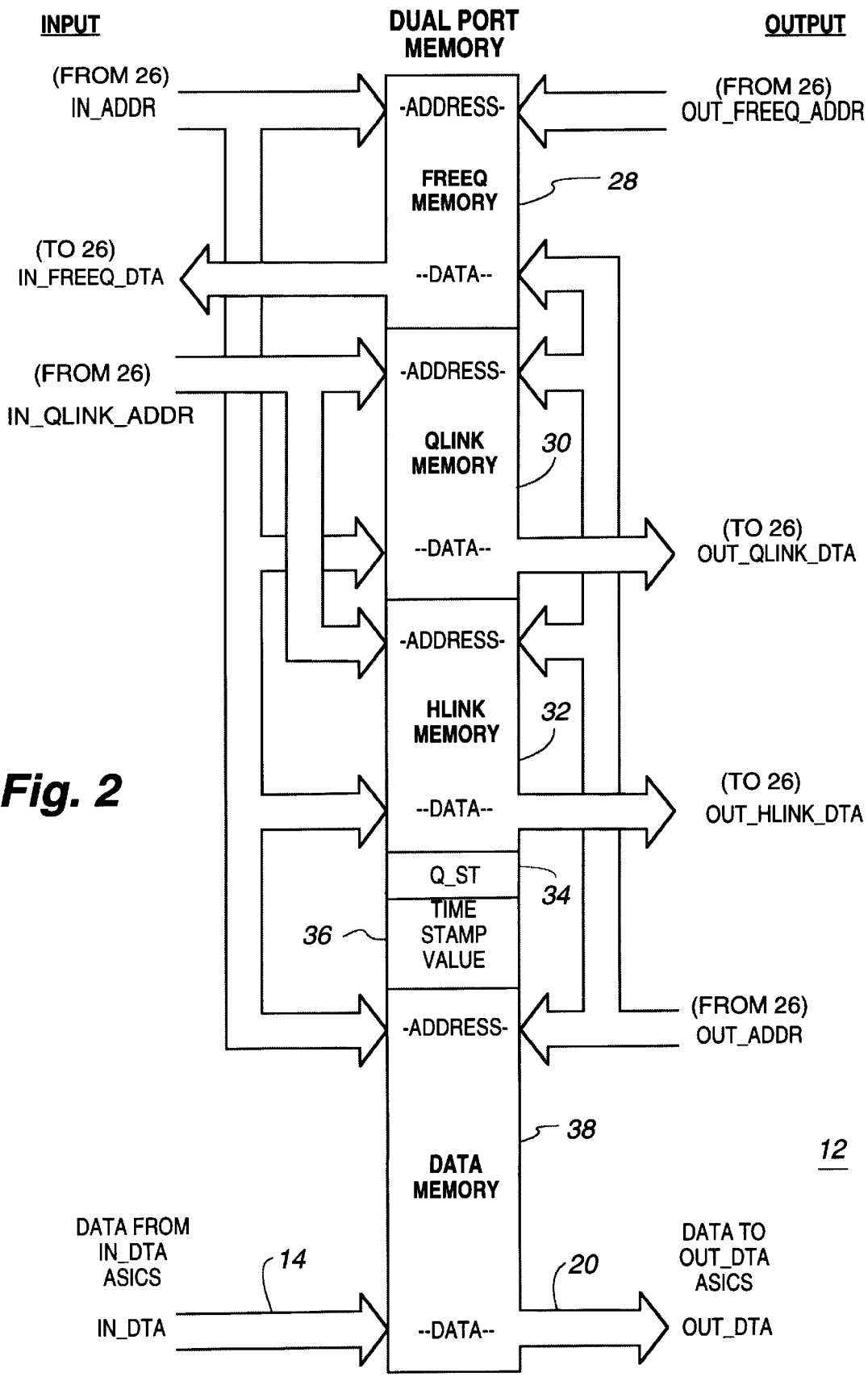
FIG. 2 is an additional functional block diagram of a dual-port memory block for use in conjunction with the central memory switch architecture of the preceding figure.

With reference additionally now to FIG. 2, the dual port memory 12 is shown in greater detail. The dual port memory 12 is partitioned into a number of specific data regions which are addressed by the switch controller 26 (FIG. 1). These include a free queue ("FREEQ") memory 28, a queue link ("QLINK") memory 30, a horizontal link ("HLINK") memory 32 and a data memory 38. The dual port memory 12 also includes a queue state ("Q_ST") portion 34 and a time stamp value portion 36.

For input processing, the FREEQ memory 28 is addressed by the switch controller 26 by means of an IN_ADDR bus as shown to provide data on an IN_FREEQ_DTA bus. For output processing the memory is addressed by OUT_FREEQ_ADDR using the OUT_ADDR as data input. Similarly, the QLINK memory 30 is addressed by the switch controller 26 by means of an IN_QLINK_ADDR bus using IN_ADDR for data on the input side and using OUT_ADDR bus for addressing to provide data on an OUT_QLINK_DTA bus as shown for output processing. Similarly, the HLINK memory 32 is addressed by signals on the same address buses as the QLINK memory 30 to provide data on an OUT_HLINK_DTA bus to the switch controller 26. This is true because an HLNK or QLNK operation are mutually exclusive. The data memory 38 is addressed by both the IN_ADDR and OUT_ADDR buses (A_ADDR and B_ADDR respectively in FIG. 1) to operatively control the flow of data between the TDM input bus 14 (IN_DTA) and the TDM output bus 20 (OUT_DTA).

In operation, when the switch controller 26 presents an address on IN_ADDR to the FREEQ memory 28 of the dual port memory 12, a pointer on the IN_FREEQ_DTA bus points to the next available free buffer, or memory device(s). When an address is presented to the Q_LINK memory on the IN_QLINK_ADDR the IN_ADDR of the current buffer is used as data to add this buffer to the Q_LINK. In the case of an entry, it is either added to the queue or a horizontal link is followed as will be more fully described hereinafter. In any given TDM cycle only one or the other input operations will be performed. The Q_ST portion 34 keeps track of whether or not the QLINK or HLINK is to be updated by determining whether the destination buffer is an "only" or a "first", "middle", or "last".

Figure 3:
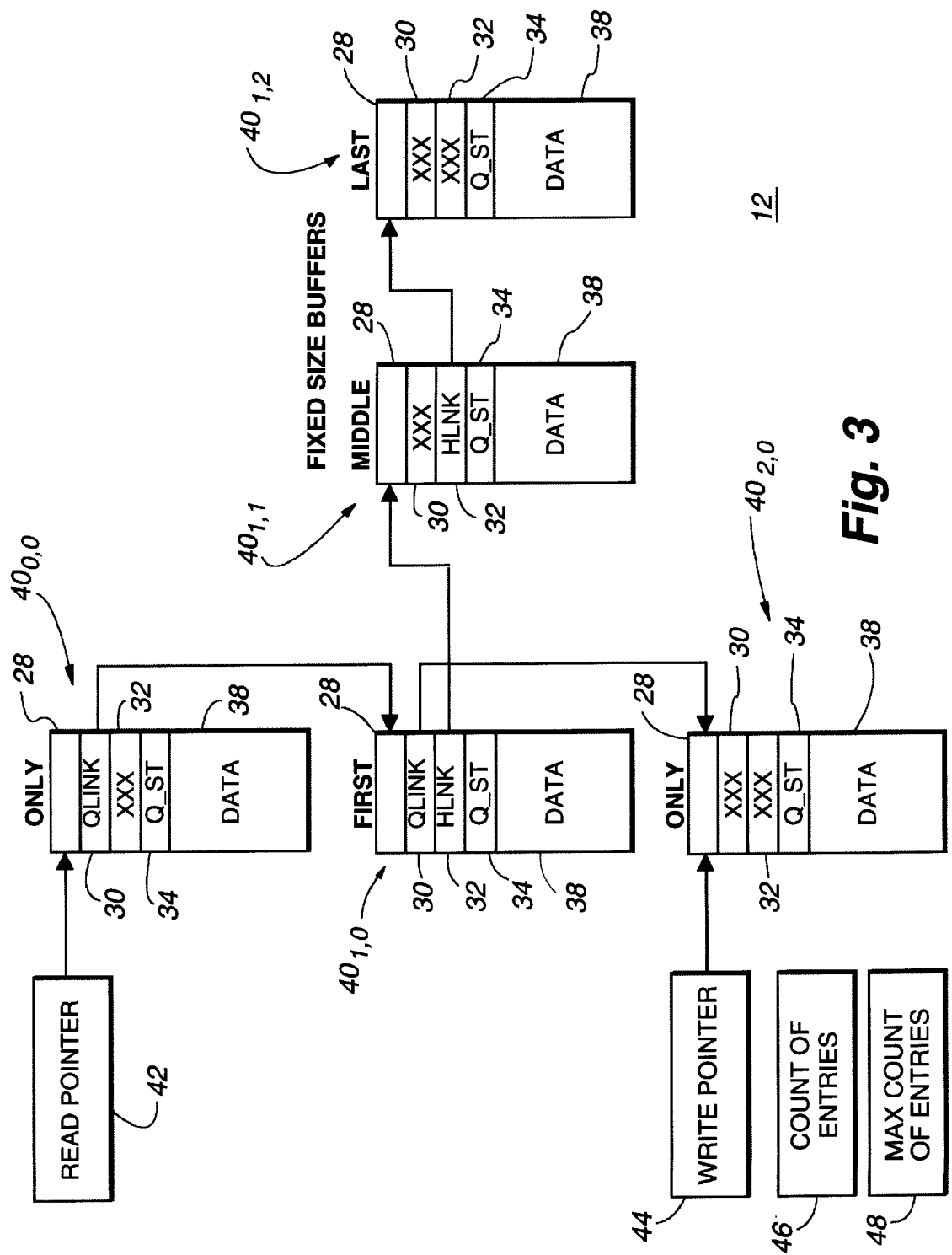
FIG. 3 is a representative illustration of the queuing structure for the fixed-size buffers forming the dual-port memory of the preceding figure.

With reference additionally now to FIG. 3, an example queuing operation is illustrated in conjunction with a number of fixed-size buffers $40_{0,0}$ through $40_{N,N}$ linked both vertically and horizontally forming a portion of the dual port memory 12 of the preceding figures. Referring to the initial read pointer 42, it points to the FREEQ memory 28 of an initial fixed-size buffer $40_{0,0}$. The QLINK memory 30 of buffer $40_{0,0}$ points to the FREEQ memory 28 of buffer $40_{1,0}$ since the buffer $40_{0,0}$ is an "only" buffer as determined by the contents of the Q_ST portion 34 thereof. The buffer $40_{1,0}$ is a "first" buffer as determined by the Q_ST portion 34 thereof so its HLINK memory 32 points to the FREEQ memory 28 of buffer $40_{1,1}$ which is a "middle" buffer as determined by its Q_ST portion 34. In turn, the HLINK memory 32 of buffer $40_{1,1}$ points to the FREEQ memory 28 of buffer $40_{1,2}$ which is a "last" buffer in this particular horizontal link as determined by its Q_ST portion 34. The QLINK memories 30 of buffers $40_{1,1}$ and $40_{1,2}$ provide no pointers to any other queue and the HLINK memory 32 of buffer $40_{1,2}$, since it is a "last" buffer, provides no pointers to any other buffers in the same horizontal link.

The QLINK memory 30 of buffer $40_{1,0}$ points to the FREEQ memory 28 of buffer $40_{2,0}$ as does a write pointer 44 in this exemplary illustration. Since buffer $40_{2,0}$ is an "only" buffer (as determined by its Q_ST portion 34) and is the end of the particular queue, the QLINK memory 30 and HLINK memory 32 provide no pointers to any subsequent buffers.

In this exemplary illustration the QLINK pointer of buffer $40_{0,0}$ points to the FREEQ memory 28 of buffer $40_{1,0}$ which is, logically, vertically below. Buffer $40_{1,0}$, being the "first" buffer in a horizontal row then has its HLINK pointer directed toward buffer $40_{1,1}$ ("middle") which, in turn, has its HLINK pointer directed toward buffer $40_{1,2}$ ("last") as determined by their Q_ST entries. However, Buffer $40_{1,0}$ also has its QLINK pointer coupled to the FREEQ memory 28 of buffer $40_{2,0}$ which will not be acted upon until Q_ST last is reached on the preceding horizontal row of buffers $40_{1,0}$–$40_{1,2}$. A count of entries 46 allows the switch controller 26 (FIG. 1) to determine whether or not a particular queue is full or empty. A max count of entries 48 is a test condition that allows for a comparison to the count of entries 46 such that a single port does not acquire or hold a number of the memory resources beyond a predetermined amount.

At this point, it should be noted that the Fibre Channel fabric topology includes a number of classes of service which currently include:

Class 1: "connection oriented" or dedicated connection. A connection between nodes is established and data exchange is begun, with or without pauses. Frames require confirmation of receipt and following completion of the data exchange, the nodes disconnect. While the dedicated communication link is, in some respects, an advantage, a concomitant disadvantage is that no other node may communicate with the sending and receiving nodes for the duration of the connection;

Class 2: "connectionless" operation. This is a more interactive mode of operation and no dedicated communication between nodes is established. In this mode, a stream of frames may be transmitted or received to/from differing nodes in rapid succession. This class also requires frame confirmations by the recipient;

Class 3: "datagram" service. This operational mode is similar to Class 2 but does not require confirmation of frame delivery; and Class 4: "connection oriented" operation which utilizes "virtual" connections rather than dedicated connections. Bandwidth of a port is distributed among several destinations and is intended to be part of FC-PH-2 (Fibre Channel Enhanced Physical Interface).

With reference additionally now to FIG. 4, a tabular representation of the various registers utilized in implementing the system and method of the present invention are shown. The output port registers include the following output queues: Q_WR (write pointer); Q_RD (read pointer); Q_COE (count of entries); Q_MAX_COE (maximum count of entries); and Q_TIMER (queue timer). The output port control for the output port registers include: STATE (output port state, e.g. "ready for output" or "long frame in progress"); and HLINK_RDPTR ("long frame" horizontal link read pointer).

The input port registers include: STATE (input port state, e.g. "long frame in progress"); and HLINK_WRPTR ("long frame" horizontal link write pointer. The free memory registers include: FREEQ_RDPTR (read pointer); FREEQ_WRPTR (write pointer); and FREEQ_COE (count of entries). In the embodiment illustrated, the input port registers comprise three registers per buffer type per partition.

The succeeding Table 1 illustrates representative calculations of memory/TDM bandwidth, cycle time and bus width requirements for various numbers of ports.

TABLE 1

| CENTRAL MEMORY ORGANIZATION | | | |
|---|---|---|---|
| # PORTS | BW RQD (GBps) | Cycle (ns) | Width (Bytes) |
| 16 | 1.6 | 20 | 32 |
| 32 | 3.2 | 20 | 64 |
| 64 | 6.4 | 20 | 128 |
| 16 | 1.6 | 40 | 64 |
| 32 | 3.2 | 40 | 128 |
| 64 | 6.4 | 40 | 256 |

In the preceding Table 1, the port speed is assumed to be 100 MBytes/second, full duplex. The bandwidth required ("BW RQD") is the total required per direction (in/out). The use of dual-port static random access memory ("SRAM") devices is also assumed. Current, commercially available SRAMs provide an access time of on the order of 12 nanoseconds ("ns"). When used in conjunction with reasonable propagation delays (6 nsec.) and setup times (1 nsec.) with Advanced BiCMOS Technology ("ABT") registers a memory/TDM cycle time of 20 ns can be achieved.

Figure 5A:
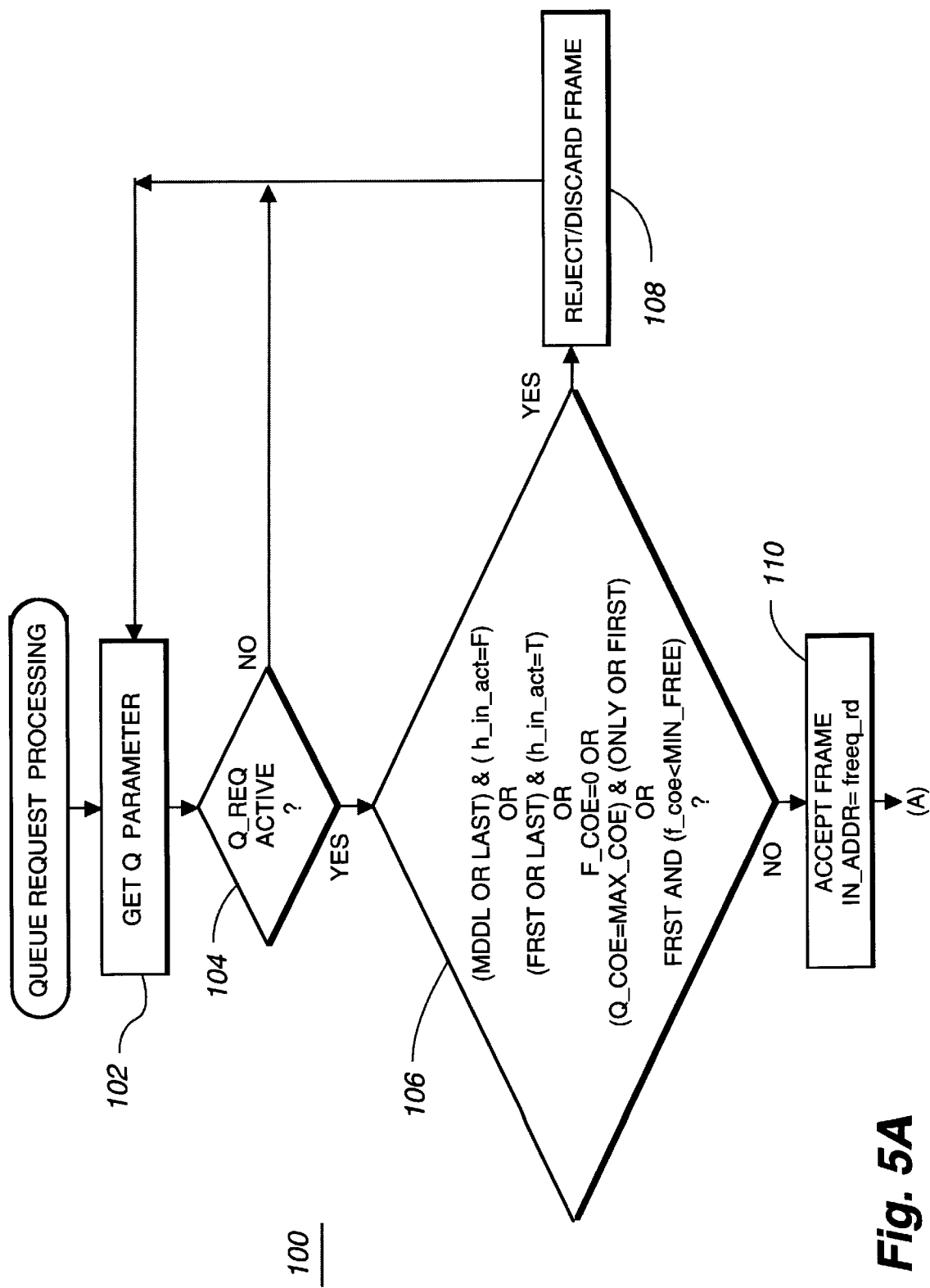
FIGS. 5A and 5B are a representative logic flow chart depicting the sequence of actions required for queue request processing of input data to the central memory switch of the present invention utilizing fixed-size buffers and horizontal linking.
Figure 5B:
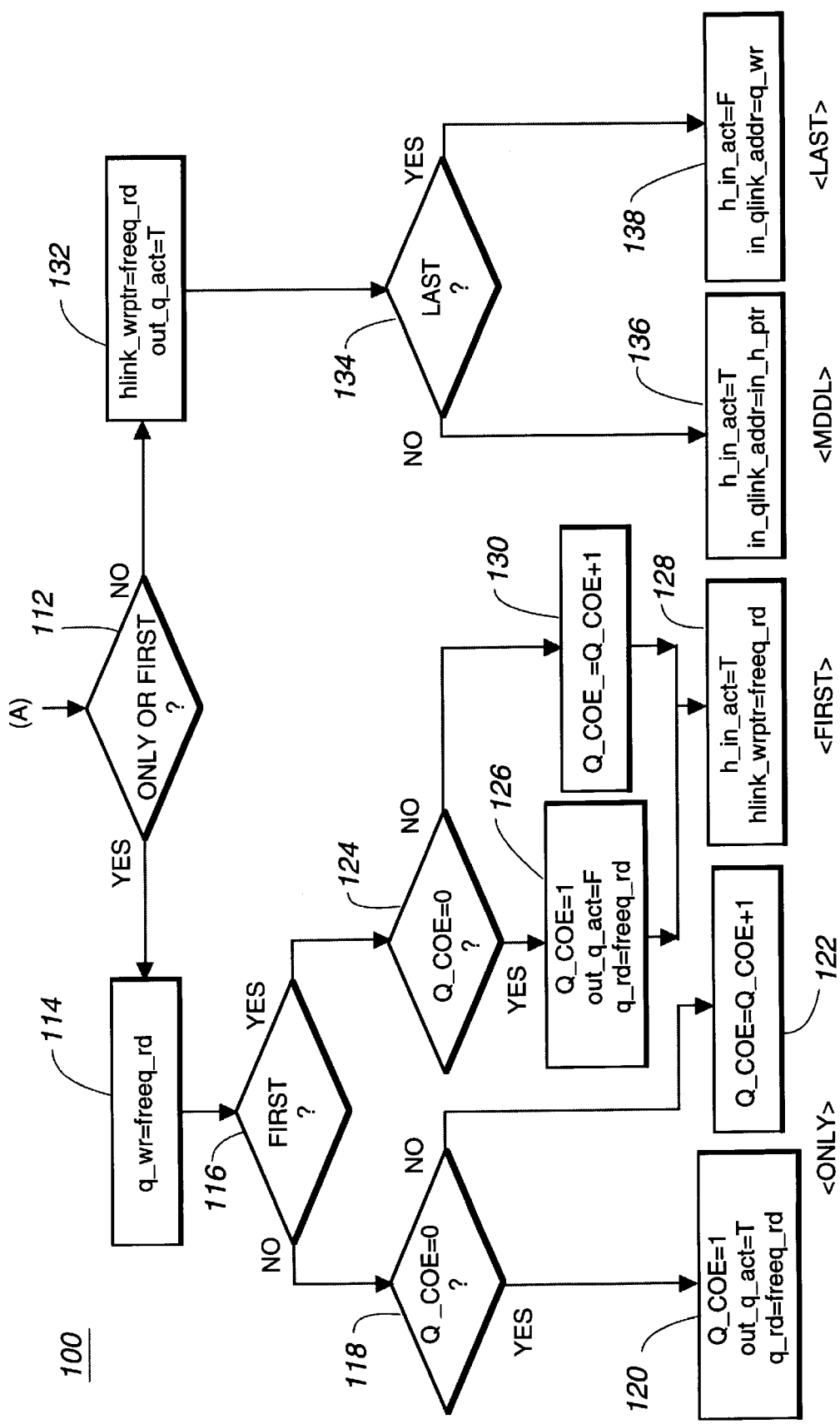

With reference additionally now to FIGS. 5A and 5B, a representative flowchart illustrating a representative output queue request processing sequence 100 for a central memory switch in accordance with the present invention incorporating single-size buffers and horizontal linking of buffers is shown. The sequence 100 substantially parallels the pseudocode listing of Table 2 hereinafter.

The sequence 100 begins at step 102 by retrieving the queue parameters ("Get Q Param") followed by decision step 104 wherein it is determined whether or not the queue request is active ("Q_REQ active"). If the queue request is not active, the sequence 100 returns to step 102. On the other hand, if the queue request is active, then at decision step 106, if any of the following is determined to be true, the frame data is either rejected or discarded at step 108 and the sequence 100 also returns to step 102: a) if the frame is a "middle" or "last" frame ("MDDL" or "LAST") and (h_in_act=false); b) if the frame is a "first" or "only" frame ("FRST" or "ONLY") and (h_in_act=true); c) if the free count of entries is zero ("F_COE=0"); d) if the queue count of entries is equal to the maximum count of entries ("Q_COE=MAX_COE") and the frame is an "only" or "first" frame; or e) if the frame is a "first" frame and the free count of entries is less than the value of MIN_FREE ("f_coe<MIN_FREE"). If none of the foregoing a) through e) are true, then at step 110 the frame is accepted and the input address is set to the value of freeq_rd ("IN_ADDR=freeq_rd").

Alternatively, if the frame is a "last" frame, then h_in_act="false" and IN_QLINK_ADDR=q_wr at step 138.

The following Table 2 provides an analogous representative pseudocode implementation of the input actions required for pipelined control of a central memory switch in accordance with the present invention incorporating single-size buffers and horizontal linking of buffers.

TABLE 2

SWC In Flow Control

| IN CYCLE | ACTION | | Description |
|---|---|---|---|
| T-1 | Select Q to be used IF Continuation: | | Dest. Queue is probably decided by PORT Continuation is set for 2nd through Last buffers of a frame. |
| | THEN:IN_QLINK_ADDR:=HLINK WRPTR | | Use Horizontal Link to attach to previous buffer of frame. |
| | ELSE:IN_QLINK_ADDR:=QLINK_QRPTR | | To link new buffer to previous bottom of Queue. |
| | ENDIF; IN_ADDR:=FRREQ_RDPTR; | | Use address of 1st buffer on Free Queue stack. |
| | EN_WR_HLINK:=Continuation; | | Link onto previous buffer of this frame. |
| | EN_WR_DATA:=TRUE; | | Enable Data memory write. |
| T | IF NOT Continuation; THEN:Q_COE:=Q_COE+1 | | Increment Count of Entries on selected Queue |
| | Q_WRPTR:=FREEQ_RDPTR; | | Place the Free buffer on the bottom of the selected Queue. |
| | IF Q_COE=0 THEN:Q_RDPTR:=FREEQ_RDPTR; | | Queue was empty so initialize the Read Pointer also. |
| | ELSE:EN_WR_QLINK; ENDIF; ENDIF; | | Link new frame onto selected queue. |
| | FREEQ_RDPTRI=IN_FREEQ_DTA; | | Update Free Queue Read Pointer. Note: This is a critical timing path!!!! |
| | FREEQ_COE:=FREEQ_COE−1; | | Decrement Count of entries on Free Queue. |
| | HLINK_WRPTR:=FREEQ_RDPTR; | | Save Free buffer address for continuation of long frame. |
| T+1 | IF Q_COE=1: | | Protect case where a queue with a single entry has a simultaneous add and removal. |
| | THEN: Q_RDPTR:=Q_WRPTR; ENDIF; END; | | |

At decision step 112, if the frame is an "only" frame or a "first" frame, then q_wr is set to freeq_rd at step 114. Thereafter, at decision step 116, if the frame is not a "first" frame, it must be an "only" frame and the value of the queue count of entries ("Q_COE") is tested to see if it is zero at decision step 118. If Q_COE=0, then at step 120, the queue count of entries is set to "1", out_q_act is "true" and q_rd=free_rd. Alternatively, if Q_COE≠0, then Q_COE is incremented by one ("Q_COE=Q_COE+1") at step 122. At decision step 116, if the frame is a "first" frame (and not an "only" frame) then, at decision step 124, if Q_COE=0, then Q_COE is set equal to "1", out_q_act is "false" and q_rd=freeq_rd at step 126. Thereafter, at step 128, h_in_act="true" and HLINK_WRPTR=freeq_rd. Alternatively, if at decision step 124 Q_COE≠0, then Q_COE=Q_COE+1 at step 130 followed by step 128.

At decision step 112, if the frame is neither "first" nor "only", then it must be a "middle" or "last" frame and the sequence 100 proceeds to step 132 where HLINK_WRPTR=freeq_rd and out_q_act="true". Thereafter at decision step 134, if the frame is not a "last" frame (and, hence, a "middle" frame) h_in_act="true" and IN_QLINK_ADDR=HLINK_WRPTR at step 136.

Figure 6A:
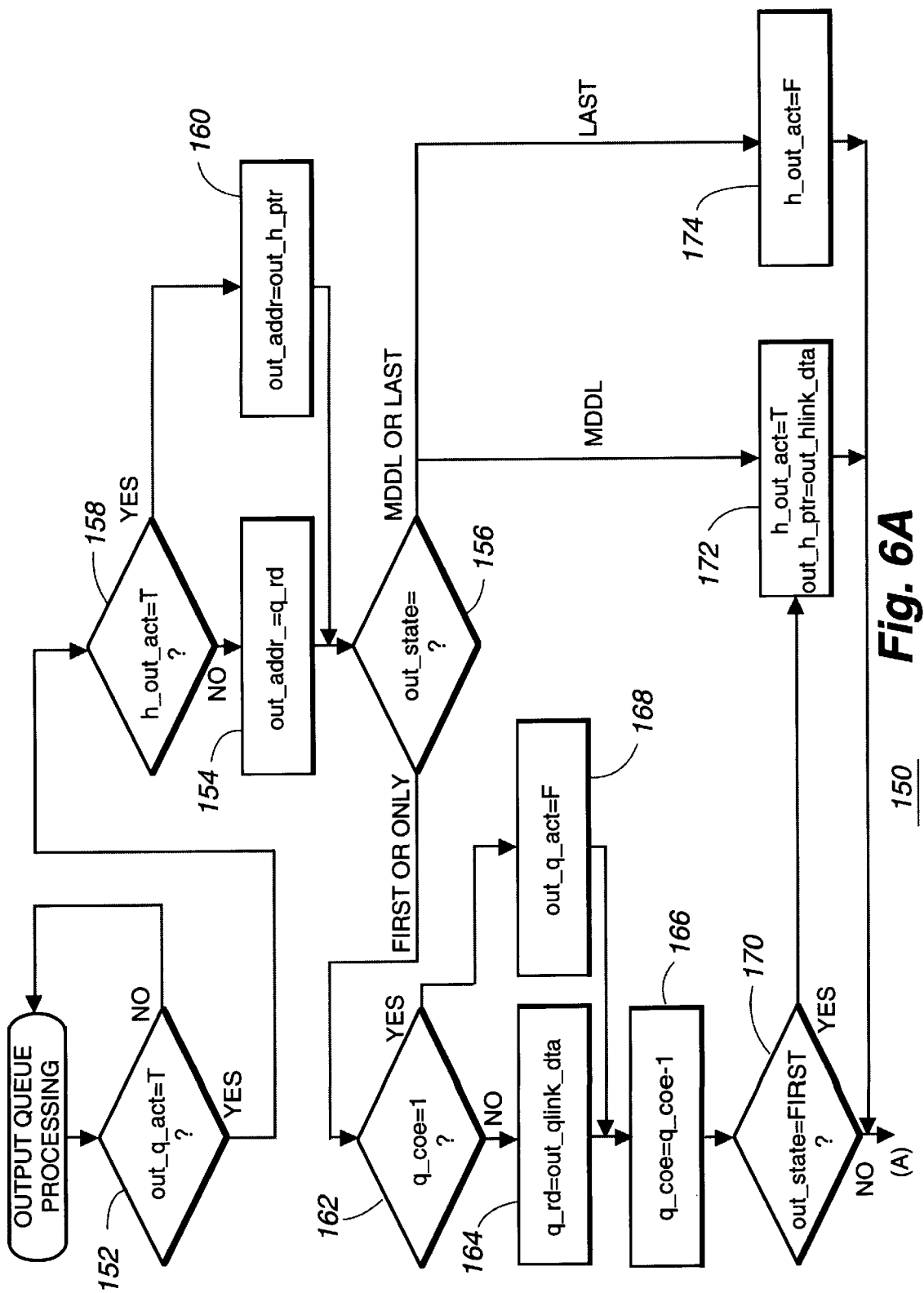
FIGS. 6A and 6B are a further representative logic flow chart depicting the sequence of actions required for output queue processing and free queue processing of output data from the central memory switch of the present invention.
Figure 6B:
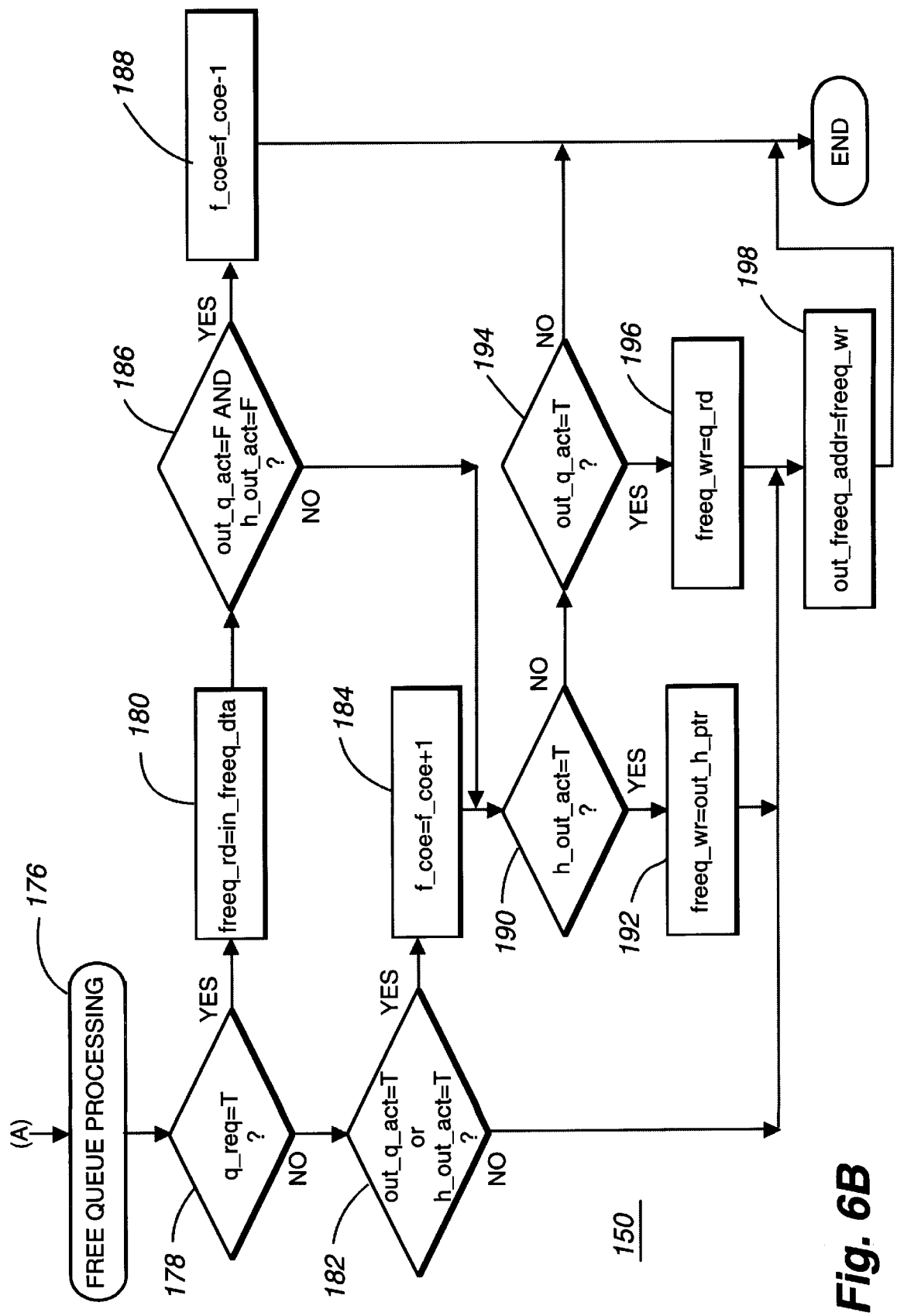

With reference additionally now to FIG. 6A and 6B, a representative flowchart illustrating an output queue processing and free queue processing sequence 150 of a central memory switch in accordance with the present invention incorporating single-size buffers and horizontal linking of buffers is shown. The sequence 150 output queue processing begins at decision step 152 where if out_q_act is "true", then the process proceeds to decision step 158 where, if the result is "false, the process proceeds to step 154 where OUT_ADDR=q_rd, followed by decision step 156 as will be more fully described hereinafter. However, if at decision step 152 out_q_act="false" then the process returns to its inception until out_q_act=T. If, at decision step 158, h_out_act=T, then OUT_ADDR=out_h_ptr at step 160 and the sequence 150 proceeds to decision step 156. The state of the output frame is determined at decision step 156 ("out_state").

At decision step 156, if the output frame is a "first" or "only" frame then the sequence proceeds to decision step 162. If q_coe≠1, then q_rd=nxt_qlnk_ptr at step 164 and q_coe=q_coe−1 at step 166. Alternatively, if q_coe=1, then out_q_act is "false" at step 168 and the sequence 150 proceeds to step 166. If, at decision step 170, out_ state≠FIRST (i.e. an "only" frame) the free queue processing portion of the sequence 150 is begun at point 176.

If out_state shows that the frame is a "middle" frame at decision step 156 or a "first" frame at decision step 170, then h_out_act="true" and out_h_ptr=nxt_hlnk_ptr at step 172 followed by the initiation of free queue processing at point 176. If out_state shows that the frame is a "last" frame, then h_out_act="false" at step 174.

At decision step 178, if q_req="true", then freeq_rd= nxt_free_ptr at step 180. If q_req="false", then at decision step 182, if out_q_act≠"true" or h_out_act≠"true" then the free queue processing is completed at step 198 where OUT_FREEQ_ADDR=FREEQ_WR. Alternatively, if out_q_act="true" or h_out_act="true", then at step 184, the free count of entries is incremented by one ("f_coe=f_coe+1") and decision step 190 is reached as will be more fully described hereinafter.

Following step 180, if out_q_act="false" and h_out_act="false", then the free count of entries is decremented by one at step 188 ("f_coe=f_coe−1") and the free queue processing is completed. However, if the result of decision step 186 is "false", then at decision step 190, if h_out_act="true", then freeq_wr=out_h_ptr at step 192 and the free queue processing is completed following step 198. If h_out_act="false", then at decision step 194, if out_q_ act="true" then freeq_wr=q_rd at step 196 and the process is again completed following step 198. If out_q_act= "false", the process is completed without step 196.

The following Table 3 provides an analogous representative pseudocode implementation of the output actions required for pipelined control of a central memory switch in accordance with the present invention incorporating single-size buffers and horizontal linking of buffers.

TABLE 3

SWC Out Flow Control

| OUT CYCLE | ACTION | Description |
|---|---|---|
| T−1 | Select Q to be used | Queue Priority and continuation of Horizontally-linked buffers are considered. |
|  | IF Continuation: | Continuation buffer of a long frame. |
|  | THEN: OUT_ADDR:=HLINK_RDPTR; | Use saved address of previous buffer of this Frame. |
|  | ELSE: OUT_ADDR:=Q_RDPTR; | New Frame: Use address of 1st buffer on selected queue. |
|  | ENDIF; |  |
|  | OUT_FREEQ_ADDR:=FREEQ_WRPTR; | To link new buffer to previous bottom of Free Queue. |
|  | EN_DATA_XFR_OUT:=TRUE; | Enable Data transfer to Port. |
| T | IF NOT Continuation: |  |
|  | THEN:Q_COE:=Q_COE−1 | Decrement Count of Entries on selected Queue. |
|  | Q_RDPTR:=OUT_QLINK_DTA; | Update Queue Read Pointer. Note: This is a critical timing path!!! |
|  | FREEQ_WRPTR:=Q_RDPTR; | Place buffer on the bottom of the Free Queue. |
|  | IF FREEQ_COE= 0: |  |
|  | THEN:FREEQ_RDPTR:=Q_RDPTR; | Free Queue was empty so initialize the Read Pointer also. |
|  | ELSE:EN_WR_FREEQ | Link this buffer to the old bottom of the Free Queue. |
|  | ENDIF; |  |
|  | ELSE:FREEQ_WRPTR:=HLINK_RDPTR; | Place buffer on the bottom of the Free Queue |
|  | IF FREEQ_COE=0: |  |
|  | THEN:FREEQ_RDPTR:=HLINK_RDPTR; | Free Queue was empty so initialize the Read Pointer also. |
|  | ELSE:EN_WR_FREEQ | Link this buffer to the old bottom of the Free Queue. |
|  | ENDIF: |  |
|  | ENDIF: |  |
|  | FREEQ_COE:=FREEQ_COE+1; | Increment Count of Entries on Free Queue. |
|  | HLINK_RDPTR:=OUT_QLINK_DTA; | Update Horizontal Link Read Pointer. Note: This is a critical timing path!!! |
|  | IF BUFFER_STATE=(LAST OR ONLY): | Save "Continuation" state for next buffer processing for this port. |
|  | THEN:Continuation:=FALSE; |  |
|  | ELSE:Continuation:=TRUE; |  |
|  | ENDIF; |  |
|  | END: |  |

Figure 7:
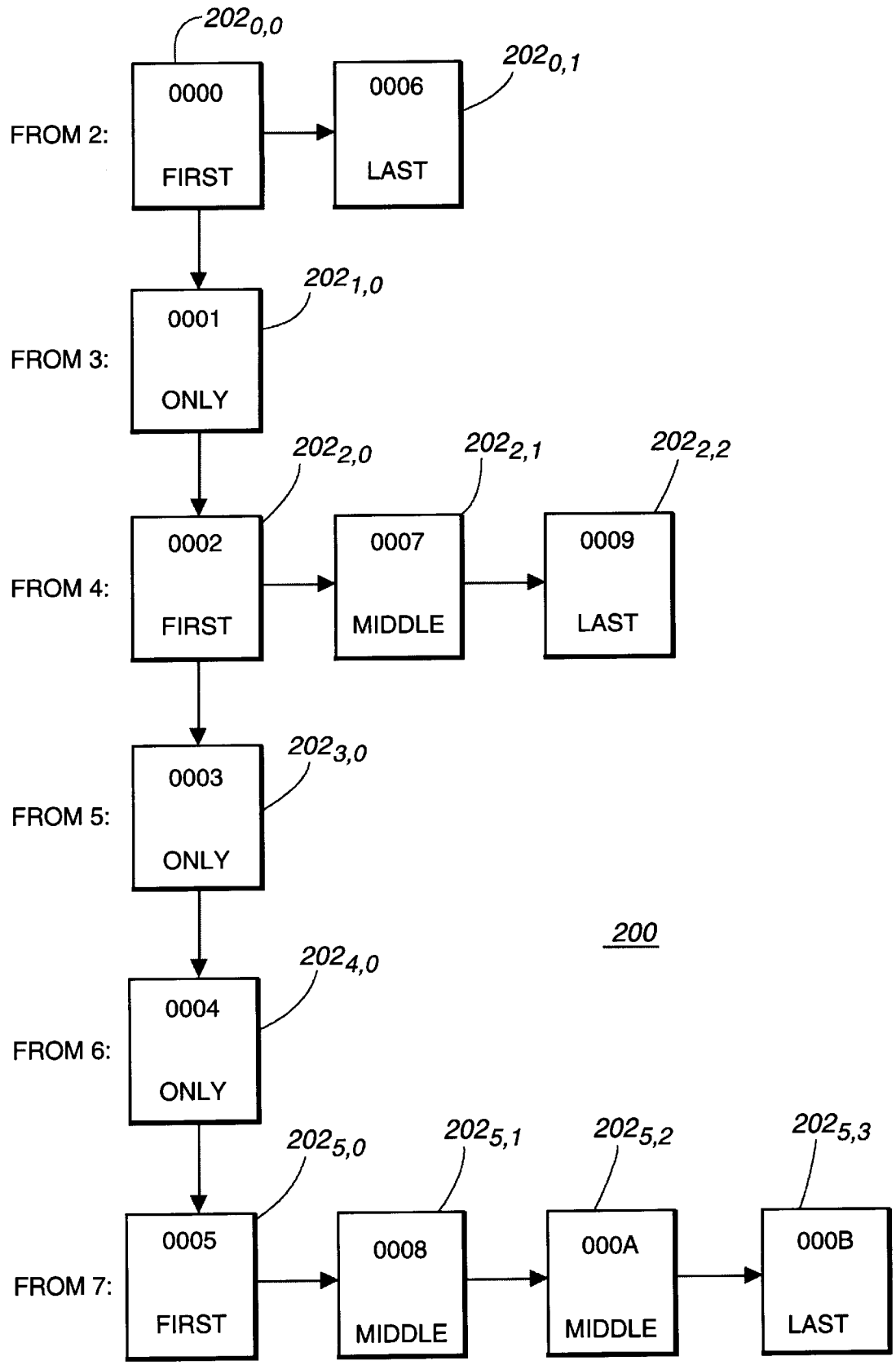
FIG. 7 is a simplified, representative illustration of a number of fixed-size buffers wherein, for purposes of example only, vertical and horizontal linking of data to a single queue from multiple sources is depicted.

With reference additionally now to FIG. 7, an example map 200 of the vertical and horizontal linking of a plurality of buffers 202 receiving frames from a plurality of source ports is shown. The placement order of the frames is 0000, 0001, 0002, 0003, 0004, 0005, 0006, 0007, 0008, 0009, 000A and 000B.

In this exemplary illustration, port 2 places "first" and "last" frames into buffers $202_{0,0}$ and $202_{0,1}$ while port 3 places an "only" frame into buffer $202_{1,0}$. Port 4 places "first", "middle" and "last" frames into buffers $202_{2,0}$, $202_{2,1}$ and $202_{2,2}$ while ports 5 and 6 place "only" frames into buffers $202_{3,0}$ and $202_{4,0}$ respectively. Finally, port 7 places "first", two "middle" frames and a "last" frame into buffers $202_{5,0}$, $202_{5,1}$, $202_{5,2}$ and $202_{5,3}$ respectively.

Figure 8A:
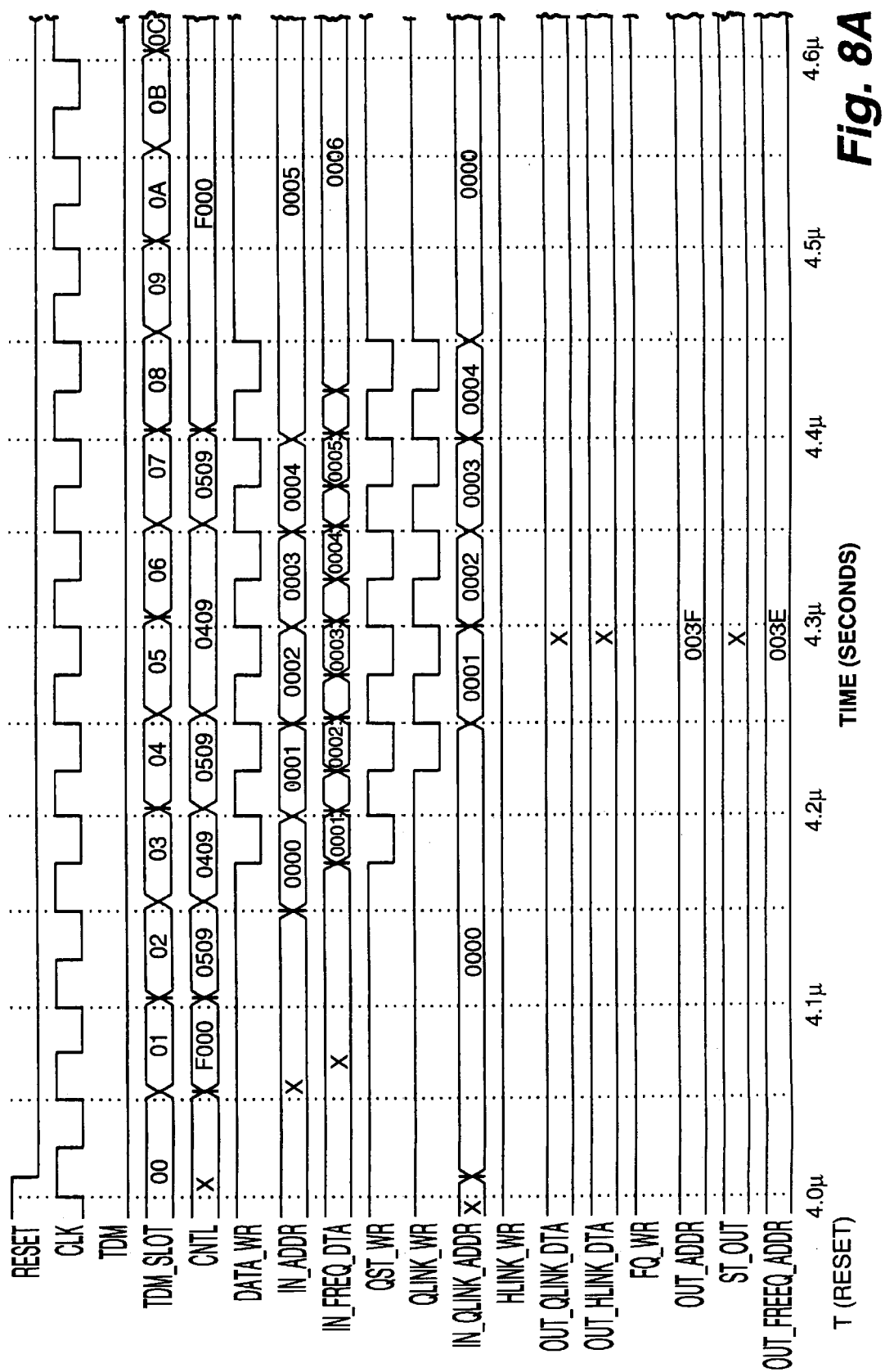
FIGS. 8A through 8D are exemplary signal waveforms for the vertically and horizontally linked queue of FIG. 7 at times TDM slots beginning at $T_0$ through 9.5 μsec.
Figure 8B:
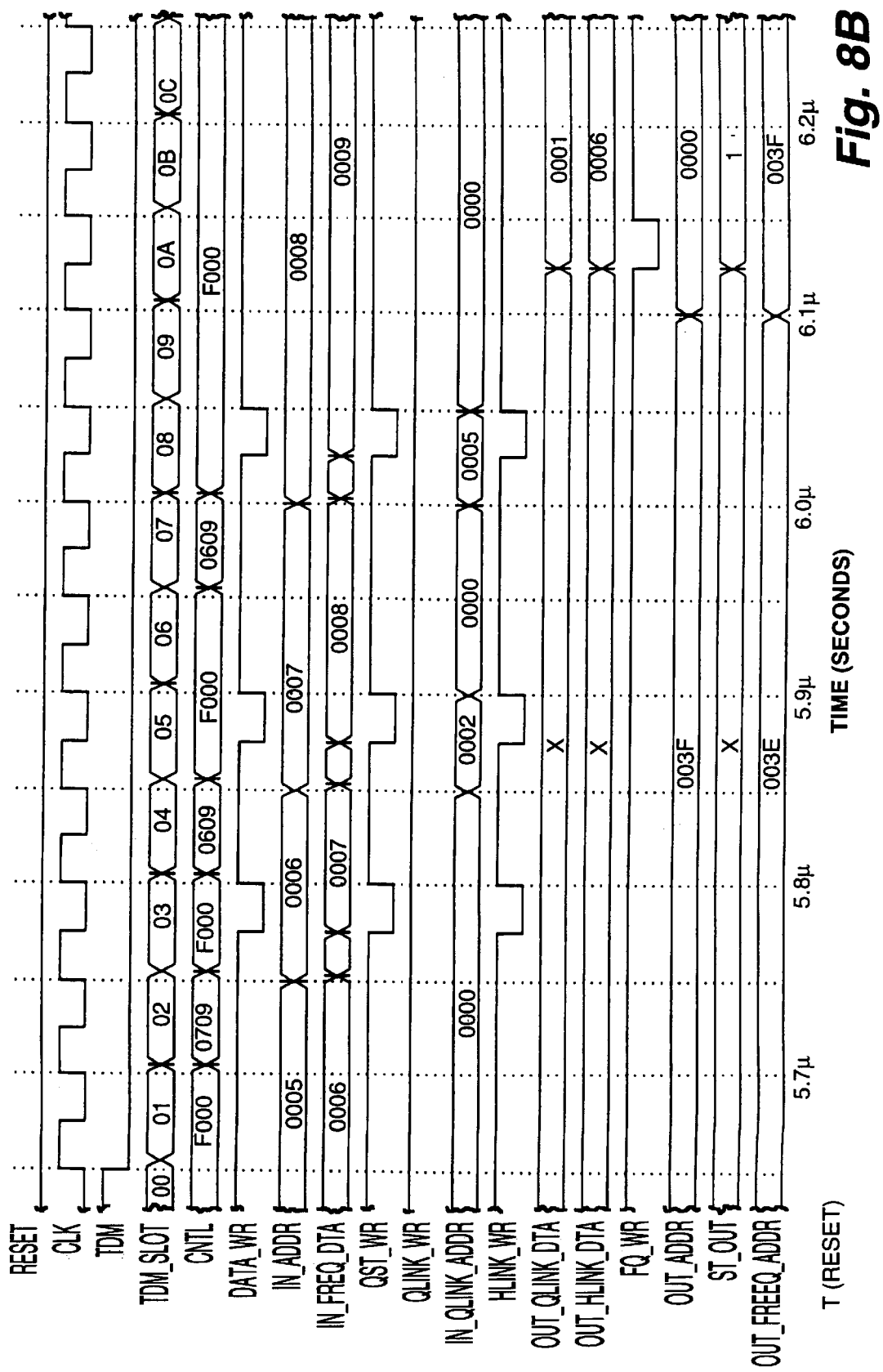
Figure 8C:
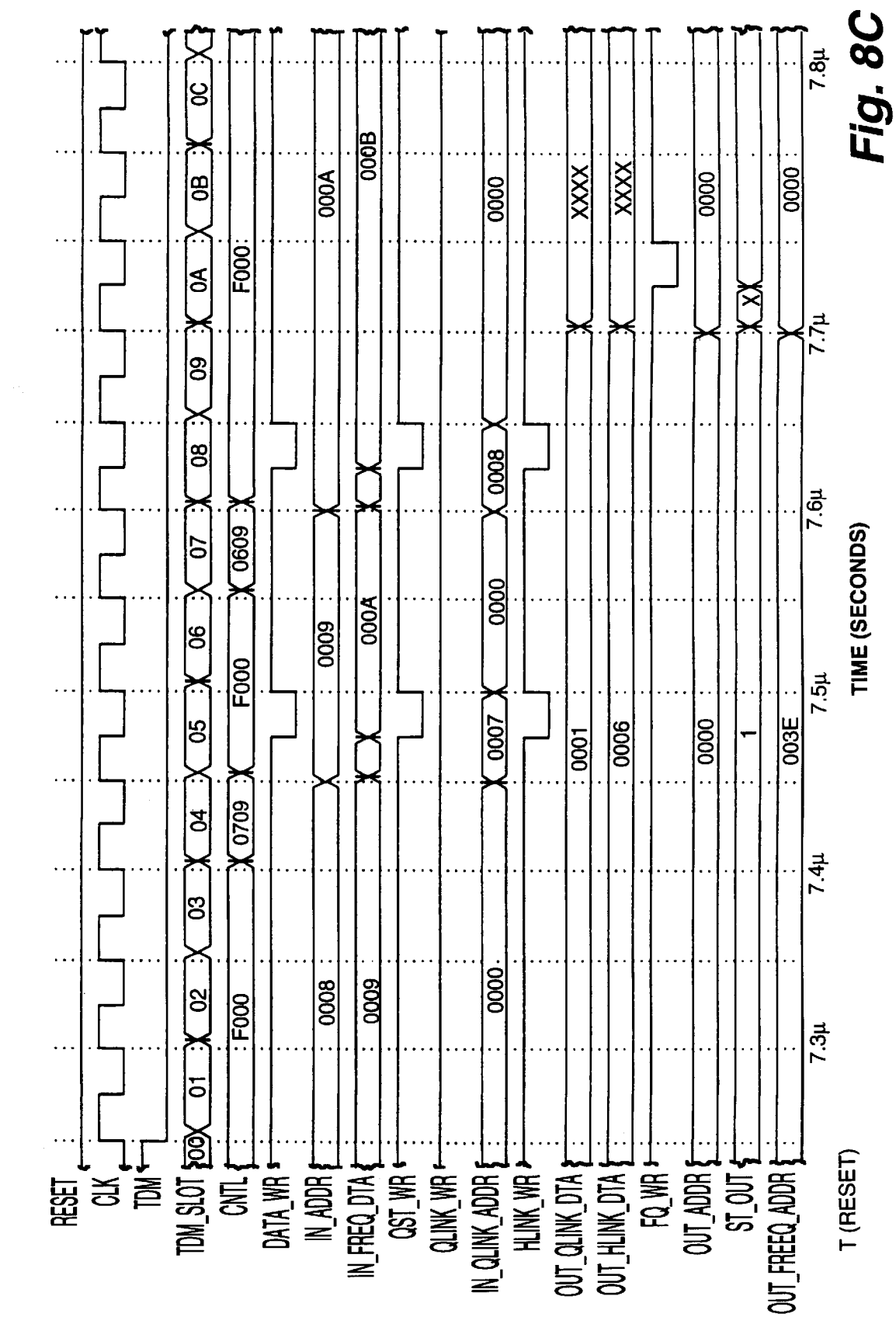
Figure 8D:
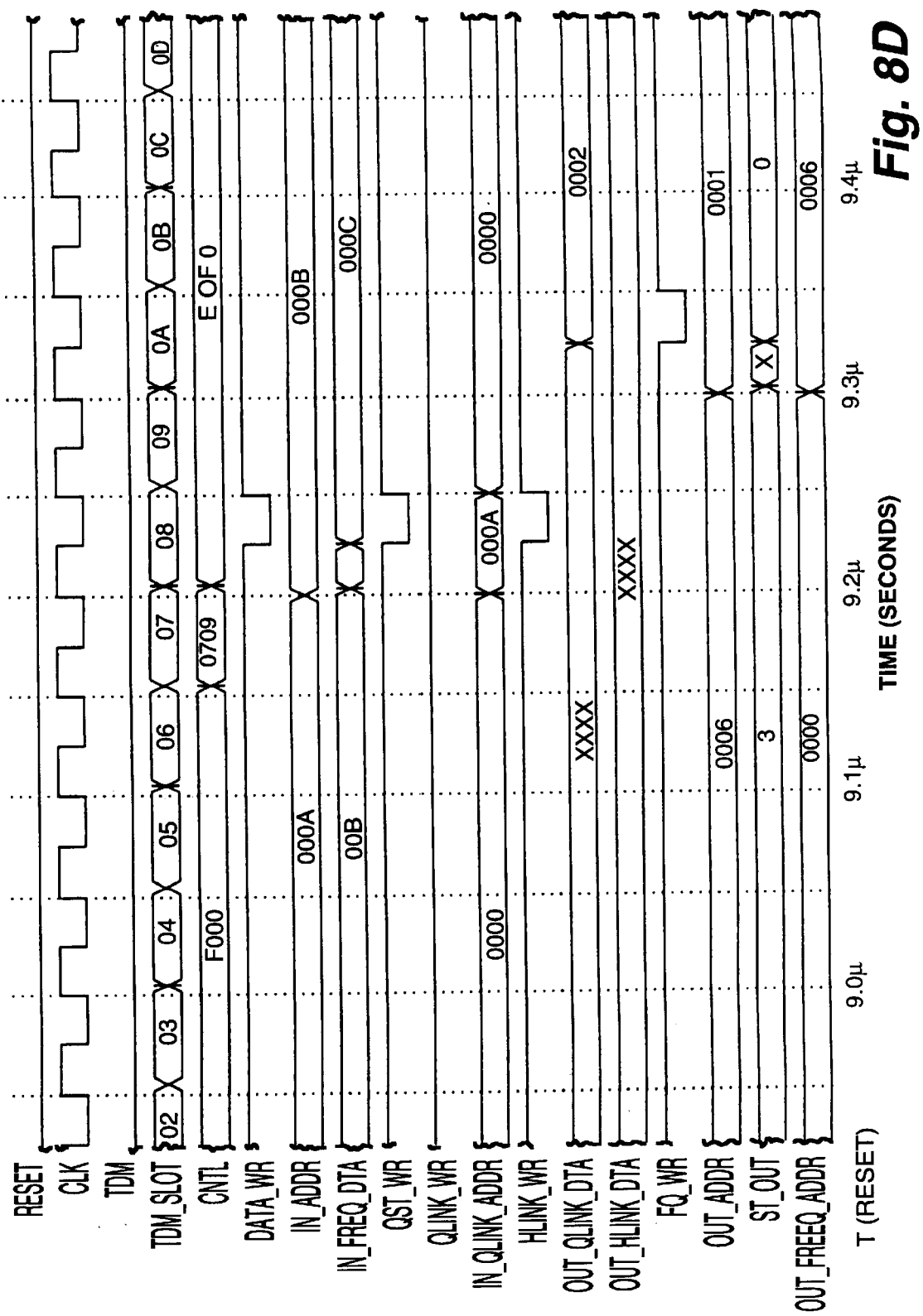
Figure 8E:
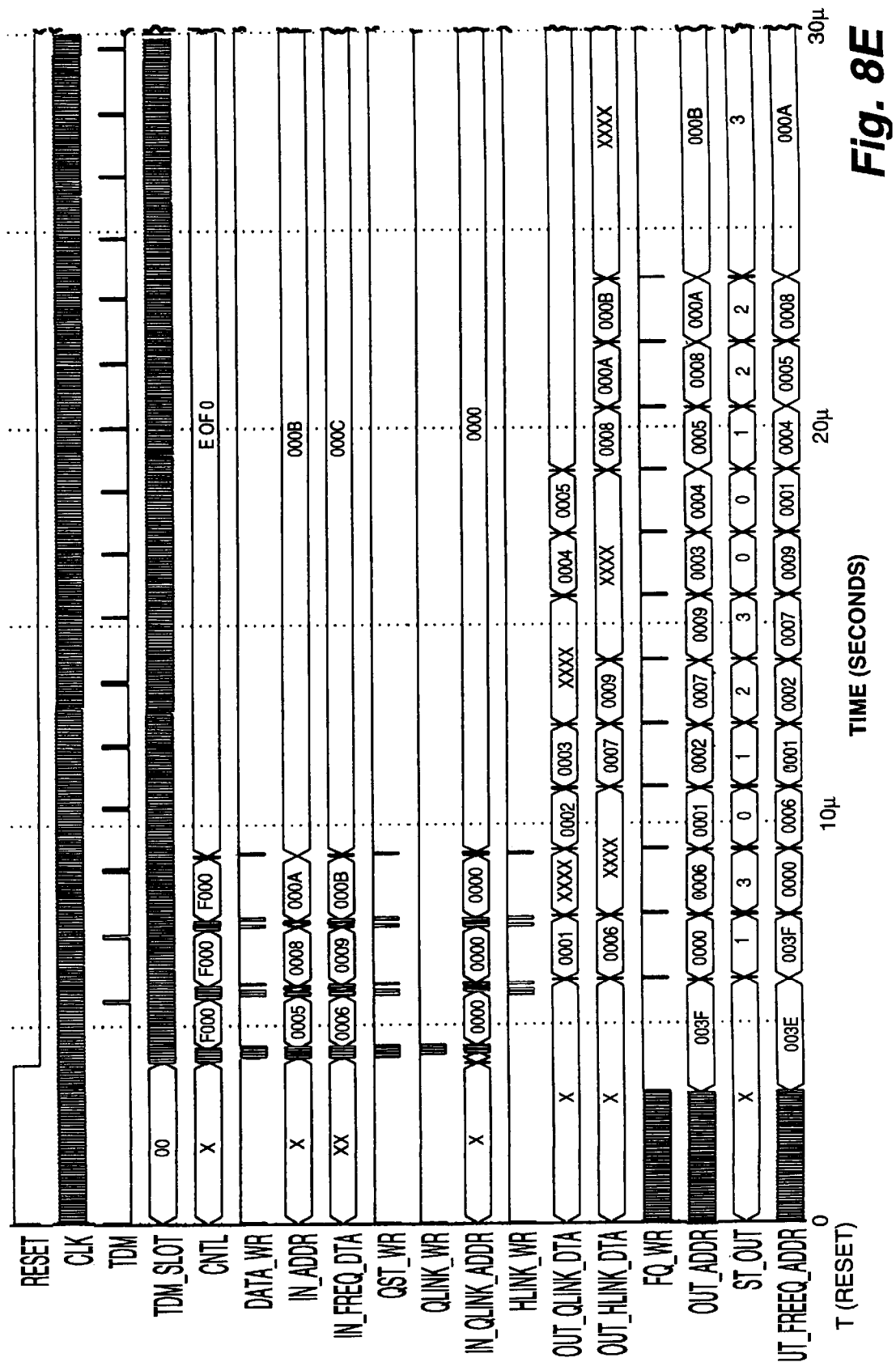
FIG. 8E is a time-compressed view of the signal waveforms of FIGS. 8A through 8D from time $T_0$ through 30 μsec.

With reference additionally now to FIGS. 8A through 8D, timing diagrams related to the operation of the system and method of the present invention in conjunction with the example linking map of FIG. 7 are shown with the frames to be placed on queue 9. That is, and in order, port 2 places a "first" frame on port 9; port 3 places an "only" frame on port 9; port 4 places a "first" frame on port 9; port 5 places an "only" frame on port 9; port 6 places an "only" frame on port 9; port 7 places a "first" frame on port 9; port 2 places a "last" frame on port 9; port 4 places a "middle" frame on port 9; port 7 places a "middle" frame on port 9; port 4 places a "last" frame on port 9; port 7 places an additional "middle" frame on port 9 and port 7 then places a "last" frame on port 9. FIG. 8E provides a time-compressed view of the timing diagrams of FIGS. 8A through 8D inclusive of time extending through 30 μsec.s beyond the rising edge of a RESET pulse. The timing diagrams illustrate the input clock ("CLK") signal, a time division multiplex ("TDM") synchronization signal and a slot ("SLOT") signal which counts from 0C through 0C repeatedly. The TDM signal pulses "high" for one CLK signal and is synchronized with slot 00.

Additional signals illustrated include: request ("REQ") control ("CNTL"), data write ("DATA_WR"), input address ("IN_ADDR"), in free queue data ("IN_FREEQ_DTA"), queue state write ("QST_WR"), state in ("ST_IN"), queue link write ("QLNK_WR"), in queue link address ("IN_QLINK_ADDR"), horizontal link write ("HLNK_WR"), output queue link data ("OUT_QLINK_DTA"), output horizontal link data ("OUT_HLINK_DTA"), free queue write ("FQ_WR"), output address ("OUT_ADDR"), output state ("ST_OUT") and output free queue address ("OUT_FREEQ_ADDR").

It can be seen that the IN signal reflects the input of frames 0000 through 000B per the exemplary illustration in the placement order previously specified. The NXTF signal indicates the next free queue. The first six QST_WR signal transitions beginning after 4.1 μsec. indicate the allocation of the input frames to the "first" or "only" buffers ($202_{0,0}$, $202_{1,0}$, $202_{2,0}$, $202_{3,0}$, $202_{4,0}$ and $202_{5,0}$); the next three transitions beginning after 5.7 μsec. indicate the allocation of the succeeding input frames to the "last" or "middle" buffers ($202_{0,1}$, $202_{2,1}$ and $202_{5,1}$); the next two transitions beginning after 7.4 μsec. indicate the allocation of the succeeding input frames to the "last" or "middle" buffers ($202_{2,2}$ and $202_{5,2}$) and the single transition beginning after 9.2 μsec. indicates the allocation of the remaining input frame to the "last" buffer ($202_{5,3}$).

The HLNK_WR signal shows three transitions beginning after 5.7 μsec. which show the horizontal link to buffers ($202_{0,1}$, $202_{2,1}$ and $202_{5,1}$) corresponding to the input frames 0006, 0007 and 0008 indicated by the IN signal. In like manner, the next two transitions of the HLNK_WR signal beginning after 7.4 μsec. show the horizontal link to buffers ($202_{2,2}$ and $202_{5,2}$) corresponding to input frames 0009 and 000A while the final transition after 9.2 μsec. corresponds to input frame 000E being written to buffer ($202_{5,3}$).

With particular reference to FIG. 8E, the NXTH signal shows the order in which the frames in the horizontal buffers are ordered, that is, frames 0006, 0007/0009 and 0008/000A/000B. The OUT signal clearly illustrates the removal order for the input frames 0000 through 000B as: 0000, 0006, 0001, 0002, 0007, 0009, 0003, 0004, 0005, 0008, 000A and 000B while the lagging F_PTR signal indicates that the particular buffer from which a frame has been removed is now available, or "free".

While there have been described above the principles of the present invention in conjunction with specific dual port buffers and numbers of input and output ports, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features which are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The applicants hereby reserve the right to formulate new claims to such features and/or combinations of such features during the prosecution of the present application or of any further application derived therefrom.

What is claimed is:

1. A memory controller comprising:

a dual port memory coupled to a time division multiplexed input bus for receiving data frames from a plurality of system ports, said dual port memory also being coupled to a time division multiplexed output bus for delivering said data frames to other ones of said plurality of system ports, said dual port memory comprising a plurality of N-byte buffers; and a switch controller coupled to said dual port memory for establishing a number of data queues therein comprising dynamically designated subsets of said plurality of N-byte buffers sufficient to store said data frames from a number of transmitting ones of said plurality of system ports having at least one data frame intended for a designated receiving one of said other ones of said system ports, wherein at least some of the subset of buffers comprise more than one N-byte buffer;

said switch controller designating whether each of said N-byte buffers is an only, first, middle or last buffer for said at least one data frame.

2. The memory controller of claim 1 wherein said data queues comprise a number of horizontally linked ones of said N-byte buffers.

3. The memory controller of claim 2 wherein said horizontally linked ones of said N-byte buffers are made available for storing other data frame portions once a portion of said at least one data frame stored therein is transmitted to said designated receiving one of said other ones of said system ports.

4. The memory controller of claim 2 wherein said N-byte buffers comprise two-port memory devices.

5. The memory controller of claim 4 wherein said two-port memory devices comprise SRAMs.

6. The memory controller of claim 4 wherein said N-byte buffers are 128 byte integrated circuit devices.

7. The memory controller of claim 1 wherein said data frames are variable length frames.

8. The memory controller of claim 1 wherein said input and output buses comprise a fibre channel bus.

9. A dual port memory for selectively directing data frames received on an input data bus to designated system nodes coupled to an output data bus in response to a switch controller, said memory including a plurality of N-byte buffers comprising:

queue and horizontal link memory portions for receiving a queue link address signal from said switch controller and providing respective queue and horizontal link data signals in response thereto, said queue and horizontal link memory portions also receiving an input address and output address from said switch controller; and free queue and data memory portions for receiving said input address and output address signals from said switch controller, said free queue memory portion also receiving an output free queue address signal from said switch controller and providing an input free queue data signal in response thereto, said data memory portion operative to store at least a portion of a data frame received on an input data bus and to direct said at least a portion of said data frame to an output data bus.

10. The dual port memory of claim 9 wherein said switch controller establishes a number of data queues comprising dynamically designated subsets of said plurality of N-byte buffers in accordance with said queue and horizontal link data signals.

11. The dual port memory of claim 10 wherein said data queues comprise a number of horizontally linked ones of said plurality of N-byte buffers.

12. The dual port memory of claim 11 wherein said horizontally linked ones of said N-byte buffers are made available for storing other data frame portions once a portion of said at least one data frame stored therein is transmitted to at least one of said designated system nodes.

13. The dual port memory of claim 9 wherein said N-byte buffers comprise two-port memory devices.

14. The dual port memory of claim 13 wherein said two-port memory devices comprise SRAMs.

15. The dual port memory of claim 13 wherein said N-byte buffers are 128 byte integrated circuit devices.

16. The dual port memory of claim 9 wherein said switch controller designates whether each of said N-byte buffers is an only, first, middle or last buffer for said at least a portion of said data frame.

17. The dual port memory of claim 9 wherein said data frames are variable length frames.

18. The dual port memory of claim 9 wherein said input and output data buses comprise a fibre channel bus.

19. A method for data transfer between a plurality of data ports in a communications system, said method comprising the steps of:

initializing said communications system;

assigning a number of data queues corresponding to each of said data ports together with an associated time division multiplex slot number;

said data queues comprising vertically linked buffers having a beginning and an ending buffer denominated as being selected from the group only buffer and first buffer;

said data queues additionally comprising horizontally linked buffers having a beginning buffer denominated as being a first buffer, having an ending denominated as being a last buffer, and if one or more intermediate buffers exist in said horizontally linked buffers, said one or more intermediate buffers being denominated as being denominated as middle buffers;

determining an address routing for each of said data queues;

receiving an input data frame on an input data bus;

reading address information from said input data frame;

placing said input data frame in a designated one of said data queues in accordance with said address information;

awaiting said time division multiplex slot number for said port; and placing said input data frame on an output data bus.

20. The method of claim 19 wherein said steps of receiving and placing are carried out by means of a fibre channel bus.

21. The method of claim 19 wherein said step of assigning is carried out by the step of:

dynamically allocating a plurality of N-byte buffers sufficient to store said input data frame.

22. The method of claim 19 further comprising the step of:

dynamically de-allocating each of said plurality of N-byte buffers following said step of placing said input data frame on said output data bus.

23. A method for transferring data between a plurality of system nodes:

assigning a time division multiplex slot for each of said plurality of nodes;

transmitting a data frame from at least one of said plurality of nodes intended for another of said plurality of nodes during a respective time division multiplex slot;

determining a byte size of said data frame;

designating a sufficient number of N-byte buffers to store said data frame in one or more data frame portions thereof;

storing said data frame portions in said number of designated N-byte buffers;

reading out said data frame portions from said number of designated N-byte buffers;

retransmitting said data frame portions to said another of said plurality of nodes during a respective time division multiplex slot; and denominating each of said N-byte buffers as an only, first, middle or last buffer.

24. The method of claim 2 wherein said steps of transmitting and retransmitting are carried out by means of a fibre channel bus.

25. The method of claim 2 wherein said step of designating is carried out by the step of:

dynamically allocating said sufficient number of N-byte buffers.

26. The method of claim 2 wherein said step of dynamically allocating is carried out by the step of:

horizontally linking said sufficient number of N-byte buffers.

27. The method of claim 2 further comprising the step of:

respectively de-allocating each of said sufficient number of N-byte buffers following said step of reading out said data frame portions.

28. A memory controller comprising:

a dual port memory coupled to a time division multiplexed input bus for receiving data frames from a plurality of system ports, said dual port memory also being coupled to a time division multiplexed output bus for delivering said received data frames to other ones of said plurality of system ports, said dual port memory comprising a plurality of N-byte buffers;

a switch controller coupled to said dual port memory for establishing a number of data queues comprising dynamically designated subsets of said plurality of N-byte buffers sufficient to store said data frames from a number of transmitting ones of said plurality of system ports having at least one data frame intended for a designated receiving one of said other ones of said system ports;

said subsets of N-byte buffers including vertically linked N-byte buffers including a beginning N-type buffer denominated as an only buffer or as a first buffer; and said subsets of N-type buffers including horizontally linked N-byte buffers including a beginning N-type buffer denominated as a first buffer, an ending N-type buffer denominated as a last buffer, and providing that any N-type buffers that are intermediate said beginning N-type buffer and said ending N-type buffer are denominated as middle buffers.

29. The memory controller of claim 28 wherein said horizontally linked N-byte buffers are made available for storing other data frame portions once a portion of said at least one data frame stored therein is transmitted to said designated receiving one of said other ones of said system ports.

30. The memory controller of claim 28 wherein said N-byte buffers comprise two port memory devices.

31. The memory controller of claim 30 wherein said two port memory devices comprise SRAMs.

32. The memory controller of claim 30 wherein said N-byte buffers are 128 byte integrated circuit devices.

33. The memory controller of claim 28 wherein said data frames are variable length frames.

34. The memory controller of claim 28 wherein said input and output buses comprise a fibre channel bus.

* * * * *